United States Patent [19]

Elliott

[11] 4,093,595

[45] June 6, 1978

[54] PROCESS FOR PREPARING POLYESTERS FROM DIPHENOLS AND AROMATIC DICARBOXYLIC ACIDS BY DIRECT POLYMERIZATION

[75] Inventor: Steven P. Elliott, Wilmington, Del.

[73] Assignee: E. I. Du Pont de Nemours and Company, Wilmington, Del.

[21] Appl. No.: 743,320

[22] Filed: Nov. 19, 1976

[51] Int. Cl.$^2$ .................. C08G 63/14; C08G 63/18
[52] U.S. Cl. .................................................. 260/47 C
[58] Field of Search ................................... 260/47 C

[56] References Cited

U.S. PATENT DOCUMENTS

| | | | |
|---|---|---|---|
| 3,651,016 | 3/1972 | Hrach et al. | 260/75 R |
| 3,965,071 | 6/1976 | McClelland | 260/75 R |
| 3,972,852 | 8/1976 | Inata et al. | 260/47 C |

Primary Examiner—Lester L. Lee

[57] ABSTRACT

A catalytic procedure is provided for the preparation of polyesters from (1) dihydric phenols and (2) aromatic dicarboxylic acids by direct polymerization.

13 Claims, No Drawings

PROCESS FOR PREPARING POLYESTERS FROM DIPHENOLS AND AROMATIC DICARBOXYLIC ACIDS BY DIRECT POLYMERIZATION

BACKGROUND OF THE INVENTION

An established procedure for making all-aromatic polyesters of fiber-forming molecular weight is thermally reacting (melt polymerization) an aromatic diacetate with an aromatic dicarboxylic acid. This reaction liberates acetic acid which is corrosive and requires the use of special corrosion resistant equipment. A further disadvantage is that esters of dihydric phenols or of aromatic diacids are more costly than the unesterified reactants. A polyesterification wherein the aromatic diacid and dihydric phenol are directly reacted with each other is of advantage since by-product water presents far less a disposal problem than phenols or acetic acid involved with ester reactants.

While preparation of polyethylene terephthalate and of monomeric diesters by catalyzed thermal esterification is known, there are frequent reports in the prior art, e.g., Polymer, V.15 August, 1974, page 530 and Kantor et al. U.S. Pat. No. 3,160,602 that direct polycondensation of a dihydric phenol with an aromatic dicarboxylic acid is impracticable or does not work. By "direct" polymerization is meant that the unesterified aromatic dicarboxylic acid and dihydric phenol are reacted to form the polymer. This is to be distinguished from the use of derivatives of such reactants e.g., diesters thereof, or the use of materials which form such derivatives in situ, e.g., diphenyl carbonate and aromatic dicarboxylic acid. As mentioned above, use of the derivatives results in formation of undesirable by-products.

U.S. Pat. No. 3,972,852 discloses a catalytic process for manufacture of polyesters from an aromatic dicarboxylic acid, or ester thereof, a dihydroxyaromatic compound and certain glycol compounds. The catalyst employed was titanium tetrabutoxide. While the patent states that aromatic acid or an ester-forming derivative may be used, either the diphenyl ester was used or the aromatic acid in combination with diphenyl carbonate was used. The combination of the aromatic acid and diphenyl carbonate yields the diphenyl ester.

A process for increasing the rate of direct polymerization, thereby resulting in polymer of increased molecular weight in less time and without the formation of corrosive or other undesired by-products, is a worthwhile objective.

SUMMARY OF THE INVENTION

The present invention is the direct polymerization of at least one dihydric phenol and at least one aromatic dicarboxylic acid to high molecular weight polymer (as measured by inherent viscosity) at elevated temperatures in the presence of a catalytically effective amount of an esterification catalyst selected from the group of antimony, tin, and titanium compounds.

DETAILED DESCRIPTION OF THE INVENTION

The dihydric phenols that are contemplated herein have hydroxyl groups directly attached to the same or different aromatic ring(s). The ring(s) may bear one or more substituents [e.g., alkyl or aryl radical(s)] inert in the polymerization reaction. Where the dihydric phenol has more than one aromatic ring, the rings may be fused or connected by a bond or by a divalent radical (e.g., alkylene, oxy). Typically useful compounds include among others, hydroquinone, methyl-1,4-hydroquinone, bis(4-hydroxyphenyl)ether, 2,6-dihydroxynaphthalene, 1,4-dihydroxynaphthalene, and others such as shown in U.S. Pat. No. 3,028,364. Chlorohydroquinone and other materials which tend to degrade under reaction conditions should be avoided.

The aromatic dicarboxylic acids that are contemplated herein have carboxyl groups directly attached to the same or different aromatic ring(s). The ring(s) may bear one or more substituents [e.g., alkyl or aryl radical(s)] inert in the polymerization reaction. Where the dicarboxylic acid has more than one aromatic ring, the rings may be fused or connected by a bond or by a divalent radical (e.g., alkylene, oxy). Typically useful compounds include among others, terephthalic acid, isophthalic acid, 2,6- and 2,7-naphthalene dicarboxylic acid. Others, such as shown in U.S. Pat. No. 3,028,364, may also be used provided they are stable under reaction conditions.

The catalysts that are useful in the process of this invention are compounds of antimony, tin, or titanium. Preferred are the metallo-organic compounds. Exemplary catalysts include antimony trioxide, tetrabutyl titanate, the mixture dimethyltin oxide/methylstannoic acid (20/80, wt./wt.), tetraisopropyl titanate, tetrakis (2-ethylhexyl) titanate, dicyclopentadienyldiphenyl titanium, stannous sulfate, stannous oxalate, dithiophenyl tin, dimethoxy tin, the mixture (di-n-butyl)tin oxide/n-butylstannoic acid (35/65 wt./wt.), and n-butylstannoic acid. Most preferred are n-butylstannoic acid and tetrabutyl titanate.

The catalyst is employed in amounts effective to increase the rate of polymerization, as shown by inherent viscosity measurements on the resulting polymer. Catalyst concentrations of at least 0.01 mole %, preferably at least 0.1 mole %, based on the moles of the diacid employed are useful in the process. As an upper practical limit, 1 mole % is suggested.

The time, temperature, and pressure conditions to be employed for optimum results will depend on the reactants used and on the selected catalyst. It is important that the reactants, e.g., the dihydric phenol and the dicarboxylic acid, and the resulting polymer suffer no substantial degradation under the polymerization conditions. The temperature must be high enough so that at least one of the reactants and the polymer that is formed will be in the molten state. Temperatures in the range of 280° C to 360° C are usually employed. However, the temperature should ordinarily not be so great as to cause degradation of the polymer as may be observed from undue darkening of the polymer. Also, to minimize oxidation, the reaction is generally carried out in an inert atmosphere such as nitrogen or argon. At a point in the process a vacuum is applied to rapidly remove water and to hasten polymerization after sufficient reaction has already taken place so that loss of reactants through sublimation or other means is minimized. Other than during the vacuum cycle, the reaction is conducted generally at atmospheric pressure, although this may be varied if desired. The reaction is conducted until the desired fiber-forming molecular weight has been reached. This point may be determined by inherent viscosity measurement or by observation of melt viscosity. Polymer having an inherent viscosity of at least 0.5 is satisfactory while an inherent viscosity of at least 0.7 is preferred. The resulting polymer may be melt spun into useful filaments, molded into bars, etc.

TEST PROCEDURES AND MEASUREMENTS

Inherent Viscosity: Inherent viscosity ($\eta$inh) is determined herein by the procedure described in Blades U.S. Pat. No. 3,869,429 except that the solvent used is a mixture of trifluoroacetic acid and methylene chloride (60/40, V/V) for all but Examples 6, 7 and 9 wherein p-chlorophenol is used. In Examples 6, 7 and 9 solution is effected by vigorously shaking a sealed vial containing a mixture of polymer and solvent, in an air bath at 200° C and then quickly cooling to 30° C. The vial was shaken in the hot air bath for 10 minutes (Ex. 6), for 2 minutes (Ex. 7) and for 4 minutes (Ex. 9).

The following non-limiting examples are presented to illustrate the present invention. It should be understood that in the procedures of the examples, materials were brought to the indicated temperature or pressure levels with reasonable speed (considering the equipment used) and without deliberate delay. The vacuum levels attained (where not expressed as in Systems 2–4 of Example 1) varied somewhat due to the variation in effectiveness of the seals in the system but were generally below 0.4 mm Hg. Higher pressure, however, may be tolerated without detriment to this process. For some examples, a slight stoichiometric excess of dihydric phenol was added in order to provide for losses of this ingredient during the course of the reaction. It will be understood, however, that the dihydric phenol and the dicarboxylic acid react in substantially equimolar amounts.

EXAMPLE 1

This example illustrates catalyzed and uncatalyzed syntheses of poly(methyl-1,4-phenylene terephthalate/2,6-naphthalate) (70/30) from the appropriate dihydric phenol and aromatic dicarboxylic acids. The utility of antimony trioxide, n-butylstannoic acid, and tetrabutyl titanate as catalysts is demonstrated.

In a 250 ml. 3-neck round bottom flask equipped with a gas inlet, mechanical stirrer, and vacuum distillation apparatus are combined methylhydroquinone (12.4 g., 0.10 mole), terephthalic acid (11.62 g., 0.07 mole), 2,6-naphthalic acid (6.48 g., 0.03 mole), and antimony trioxide (0.029 g., 1 $\times$ 10$^{-4}$ mole; 0.10 mole % of total diacids). The flask is evacuated to about 1 mm Hg pressure and refilled with nitrogen; this cycle is repeated three more times. While a slow flow of nitrogen is passed over the stirred reaction mixture, the flask is heated to 310° C using a Wood's metal bath, and is kept thereat for 60 min. The temperature is raised to 320° C and held there for 15 min. The system is evacuated to 0.1 mm Hg pressure and is kept under vacuum for 20 min. at 320° C. The heating bath is removed and the reaction mixture is allowed to cool to room temperature while under nitrogen. The copolymer obtained has an $\eta$inh equal to 0.51.

The above-described general procedure is repeated using other materials as catalysts and using no catalyst at all. Results, including that shown above, are presented in Table I. Systems 1–3 are shown to produce polymer of inherent viscosity more than twice that produced using no catalyst (System 4).

TABLE I

| System | Catalyst | Product $\eta$inh |
|---|---|---|
| 1 | $Sb_2O_3$ | 0.51 |
| 2 | $Ti(O-n-C_4H_9)_4$ "Tyzor" TBT ® | 0.59 |
| 3 | n-Butylstannoic acid | 1.00 |

TABLE I-continued

| System | Catalyst | Product $\eta$inh |
|---|---|---|
| 4 | None | 0.19 |

This example illustrates the utility of additional catalysts in the process of this invention to produce the copolymer shown in Ex. 1, using a tube reactor.

In a polymer tube reactor having gas inlet and outlet ports and fitted with a mechanical stirrer are combined methylhydroquinone (4.96 g, 0.040 mole), terephthalic acid (4.65 g., 0.028 mole), 2,6-naphthalic acid (2.59 g., 0.012 mole), and stannous sulfate ($SnSO_4$, 0.009 g., 4 $\times$ 10$^{-5}$ mole; 0.10 mole % of total diacids); reaction by-products are collected in a dry ice trap entrained with the gas outlet port. The reactor is evacuated and flushed with nitrogen as in Example 1 and is heated via a Wood's metal bath, under nitrogen. The system is heated to 310° C and kept thereat for 60 min. The temperature is raised to 320° C and is kept thereat for 15 min. The system is evacuated to 0.3 mm Hg pressure and is kept thereat for 20 min., all at 320° C. The reactor is allowed to cool and the product worked up, all as in Ex. 1. The copolymer obtained has an $\eta$inh equal to 1.25.

This procedure is repeated with stannous oxalate, ($SnC_2O_4$) and tetrakis(2-ethylhexyl)titanate("Tyzor" TOT ®) as catalysts. Results, including that shown above, are presented in Table II.

TABLE II

| System | Catalysts | Product $\eta$inh |
|---|---|---|
| 1 | $SnSO_4$ | 1.25 |
| 2 | $SnC_2O_4$ | 1.47 |
| 3 | "Tyzor" TOT | 0.73 |

EXAMPLE 3

This example illustrates preparation of the copolymer shown in Example 1, using as catalysts dithiophenyl tin, and dimethoxy tin. The syntheses are performed by the general procedure of Example 1, using argon in place of nitrogen.

Part A

In apparatus as described in Example 1 are placed methylhydroquinone (38.3 g., 0.31 mole), tereaphthalic acid (32.6 g., 0.20 mole), 2,6-naphthalic acid (18.2 g., 0.08 mole), and dithiophenyl tin (0.094g., 2.8 $\times$ 10$^{-4}$ mole; 0.10 mole % of total acids). The reaction mixture is heated 1 hr. at 300° C, then for about 40 min at 320° C. Vacuum is applied slowly (reaches 0.09 mm Hg) and is maintained for 90 min. at 320° C. The temperature is raised to 325° C. and kept thereat for 15 min. The product is allowed to cool as in Example 1, then is isolated and dried overnight in a vacuum oven at 120° C. The product has an $\eta$inh equal to 2.24. Fibers are pulled from the melt at 330° C.

Part B

A reactor is charged as in Part A, except that dimethoxy tin (0.05 g., 2.8 $\times$ 10$^{-4}$ mole; 0.10 mole % of total diacids) is used as the catalyst. The reaction mixture is heated between 300°–320° C for about 1¾ hr. Vacuum is applied (reaches 0.1 mm Hg) for 1¼ hr. at 320° C. The product is cooled and dried overnight in a vacuum oven at 120° C. The product has a $\eta$inh equal to 1.37. Fibers are pulled from the melt at 320° C.

EXAMPLE 4

This example illustrates the use of other catalyst concentrations and of shorter reaction times in the process of this invention for preparing the copolymer shown in Example 1.

Part A

A reactor is prepared and charged as in Example 1 except that the amount of n-butyl stannoic acid is 0.10 g. ($5 \times 10^{-4}$ mole; 0.50 mole % of total diacids). The reaction mixture is heated (as in Ex. 1) to 308° C and kept thereat for 30 min. The temperature is raised to 320° C and kept thereat for 5 min. The system is evacuated to 0.4 mm Hg pressure at 320° C and kept thereat for 5 min. The flask is then cooled as in Ex. 1 and the copolymer isolated. It has an $\eta$inh equal to 1.42.

Part B

A reactor is prepared and charged as in Example 1 except that the amount of methylhydroquinone is 12.77 g. (0.103 mole; 3% excess) and the catalyst is "Tyzor" TBT ® (0.04 g., $1.2 \times 10^{-4}$ mole; 0.12 mole % of total diacids). The reaction mixture is heated to 308° C (as in Ex. 1) and kept thereat for 60 min. The temperature is raised to 320° C and is held thereat for 20 min. The system is evacuated to 0.3 mm Hg pressure and is held thereat for 20 min. The flask is cooled as in Ex. 1 The copolymer has a $\eta$inh equal to 3.53.

Part C

A reactor is prepared and charged as in Example 1 except that the catalyst is "Tyzor" TBT ® (0.0034 g., $1 \times 10^{-5}$ mole; 0.01 mole % total diacids) and that argon provides the inert atmosphere. The reaction mixture is heated (as in Ex. 1) between 312°–318° C. for 65 min., then at 325° C for 10 min. The system is placed under vacuum at 325° C for 30 min. The flask is allowed to cool (under argon). The copolymer obtained has an $\eta$inh equal to 0.84.

EXAMPLE 5

This comparative example illustrates the utility of n-butylstannoic acid in the process of this invention for preparing copoly[methyl-1,4-phenylene/oxybis(1,4-phenylene) terephthalate] (7/3).

A reactor is prepared and charged as in Example 2 with methylhydroquinone (3.47 g., 0.028 mole), bis(4-hydroxyphenyl)ether (2.42 g., 0.012 mole), terephthalic acid (6.64 g., 0.04 mole), and n-butylstannoic acid (0.008 g., $4 \times 10^{-5}$ mole; 0.10 mole %, based on total diacid). The reaction mixture is heated to 300° C and kept thereat for 1 hr. The reaction temperature is raised to 320° C and is kept thereat for 15 min. The system is evacuated to 0.4 mm Hg pressure at 320° C and is kept thereat for 20 min. The reactor is allowed to cool (under $N_2$) and the product collected. It has an $\eta$inh equal to 0.74.

EXAMPLE 6

This example illustrates preparation of copoly(2,6-dimethyl-1,4-phenylene/3,3',5,5'-tetramethyl-4,4'-biphenylene terephthalate) (7/3) by the process of this invention.

A reactor is prepared and charged as in Example 2 with 2,6-dimethylhydroquinone (3.22 g., 0.023 mole), 3,3',5,5'-tetramethyl-4,4'-biphenol (2.40 g., 0.010 mole), terephthalic acid (5.48 g., 0.033 mole), and n-butylstannoic acid (0.007 g., $3.4 \times 10^{-5}$ mole; 0.10 mole % based on total diacid). The reaction mixture is heated to 310° C and is kept thereat for 1 hr. The reaction temperature is raised to 360° C and is kept thereat for 5 min. The system is evacuated to 3.0 mm Hg pressure at 360° C and is kept thereat for 5 min. The copolymer is cooled and the product collected, all as in Ex. 2. The copolymer has an $\eta$inh equal to 2.54 (p-chlorophenol).

EXAMPLE 7

This example illustrates the preparation of copoly (methyl-1,4-phenylene terephthalate/isophthalate) (50/50) by the process of this invention.

In a reaction apparatus similar to that of Example 1 are combined (under nitrogen) methylhydroquinone (42.8 g., 0.345 mole), terephthalic acid (24.8 g., 0.149 mole), isophthalic acid (24.9 g., 0.15 mole), and n-butylstannoic acid (0.063 g., $3 \times 10^{-4}$ mole; 0.10 mole % of total diacids). The reaction mixture is heated for 33 min. between 315°–340° C at atmospheric pressure. The system is gradually evacuated and heating is continued under the following successive conditions of time (min)-/temperature (° C)/pressure (mm Hg); 4/340/220, 7/340/190, 2/340/100, 7/340/30 and 21/340/<0.2. The reaction mixture is allowed to cool and the copolymer is collected. It has an $\eta$inh equal to 0.80 (p-chlorophenol).

EXAMPLE 8

This example illustrates the catalyzed synthesis of poly(phenyl-1,4-phenylene terephthalate) from phenylhydroquinone and terephthalic acid.

In an apparatus as described in Example 1 are placed phenylhydroquinone (26.97 g, 0.145 mole), terephthalic acid (22.91 g, 0.138 mole), and n-butylstannoic acid (0.029 g, $1.4 \times 10^{-4}$ mole, 0.10 mol % based on terephthalic acid). The flask is evacuated and filled with nitrogen as in Example 1 and heated as in Example 1 to 300° C and held thereat for 30 min. The temperature is raised to 310° C and held 12 min, to 320° C and held 30 min, to 330° C and held 30 min. The temperature is raised to 350° C whereupon the system is evacuated without delay to 0.5 mm Hg and held there for 13 min. The polymer is isolated as in Example 1. It has an $\eta$inh equal to 1.65 and may be spun into fiber.

EXAMPLE 9

This example illustrates the use of dicyclopentadienyldiphenyl titanium and a solvent assistant for preparing a copolyester.

In a 500 ml. resin kettle equipped similarly as the apparatus of Example 1 are combined 2,6-dimethylhydroquinone (79.5 g., 0.58 mole), 3,3',5,5'-tetramethyl-4,4'-biphenol(54.5 g., 0.22 mole), terephthalic acid (87.0 g., 0.52 mole), isophthalic acid (37.4, 0.22 mole), cyclic tetramethylene sulfone (10 ml.), and dicyclopentadienyldiphenyl titanium (0.73 g., $2.2 \times 10^{-3}$ mole; 0.3 mole % of total diacids). After an argon atmosphere is established (evacuated 5× and refilled 5× with argon), the reaction mixture is heated from 285°–300° C for 50 min. Additional cyclic tetramethylene sulfone (10 ml) is added and heating at 300° C is continued for 30 min. The temperature is raised to 345° C and kept thereat while the pressure of the system is reduced to 49 mm Hg during the next 1¾ hr. The pressure of the system is then reduced to 0.10 mm Hg and kept thereat for 30 min., all at 345° C. The system is cooled and the copolymer collected as in Example 3. For the product, $\eta$inh = 0.89 (p-chlorophenol).

I claim:

1. A direct polymerization process comprising reacting a composition consisting essentially of at, least one aromatic dicarboxylic acid and at least one dihydric phenol in the presence of a catalytic amount of a compound selected from the group consisting of antimony, tin, and titanium compounds and at a temperature sufficient to maintain the resulting polyester in a molten state.

2. The process of claim 1 wherein the catalyst is present in an amount of at least 0.01 mole % based on the total moles of dicarboxylic acid that are employed.

3. The process of claim 1 wherein the catalyst is present in an amount of from 0.1 to 1% based on the total moles of dicarboxylic acid that are employed.

4. The process of claim 1 wherein the catalyst is a metallo-organic compound.

5. The process of claim 4 wherein the catalyst is n-butylstannoic acid.

6. The process of claim 1 wherein two aromatic dicarboxylic acids are reacted with a dihydric phenol.

7. The process of claim 6 wherein the acids are 2,6-naphthalic and terephthalic acids.

8. The process of claim 6 wherein the acids are isophthalic and terephthalic acids.

9. The process of claim 1 wherein two dihydric phenols are reacted with terephthalic acid.

10. The process of claim 9 wherein the dihydric phenols are 2,6-dimethylhydroquinone and 3,3′5,5′-tetramethyl-4,4′-biphenol.

11. The process of claim 9 wherein the dihydric phenols are methylhydroquinone and bis(4-hydroxyphenyl)ether.

12. The process of claim 1 wherein one aromatic dicarboxylic acid is reacted with one dihydric phenol.

13. The process of claim 12 wherein terephthalic acid is reacted with phenylhydroquinone.

* * * * *